Patented Apr. 3, 1945

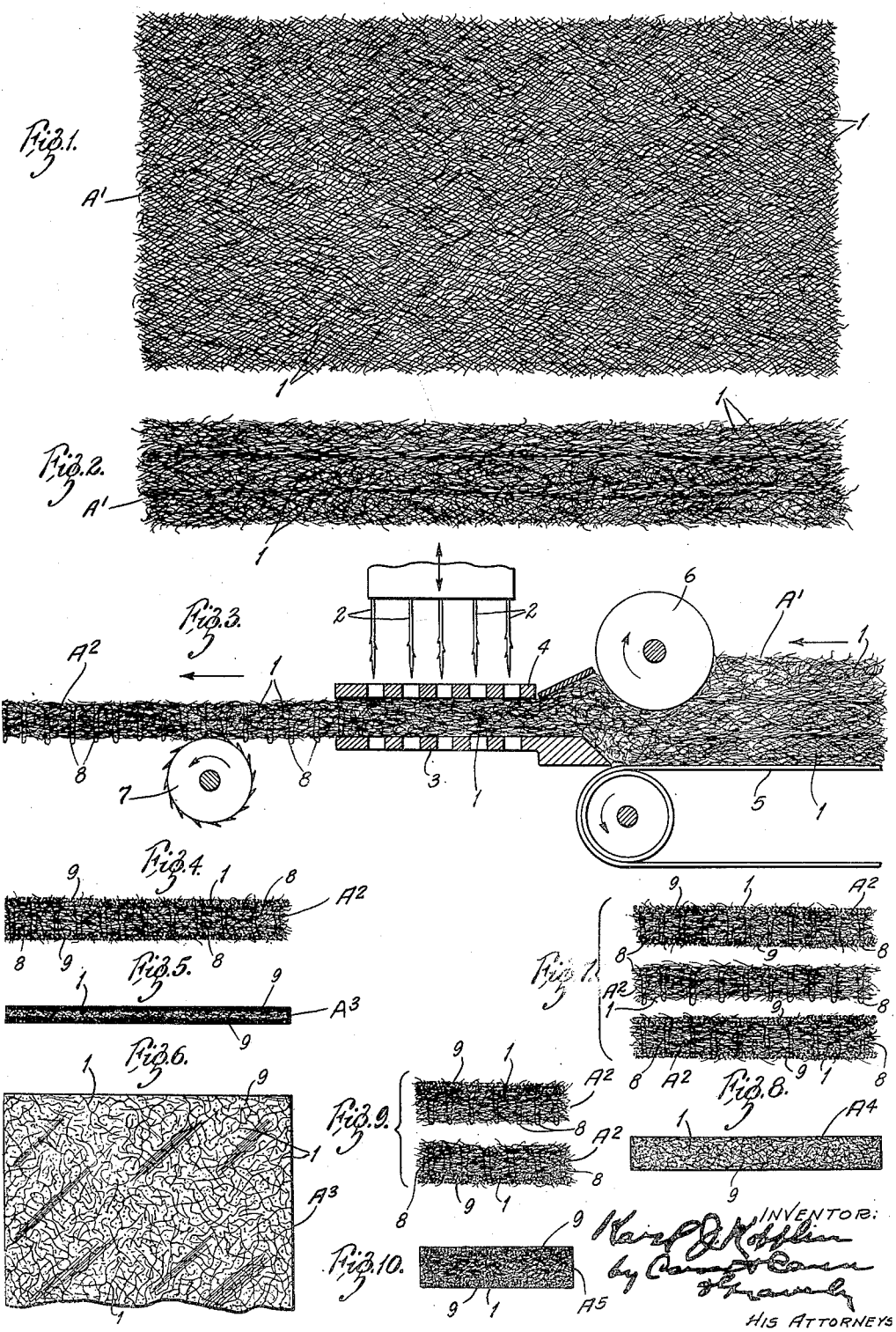

2,373,033

UNITED STATES PATENT OFFICE 2,373,033

SMOOTH SURFACE FIBROUS ARTICLE

Karl J. Kopplin, Normandy, Mo., assignor to F Burkart Manufacturing Company, St. Louis, Mo., a corporation of Missouri Application April 25, 1940, Serial No. 331,515

10 Claims. (Cl. 154—46)

Heretofore fibrous and plastic materials have been combined in various ways in the production of sheets and other articles. The principal object of the present invention is to produce a one ply or laminated sheet or other article of fiber with the least amount of bonding material consistent with economy of manufacture and the intended use of the article; also to produce such an article wherein the bonding material is mainly concentrated at the surface portion of the article. The invention consists in a compressed article whose greater portion is a mat of unwoven fiber with at least its surface portions embedded in a resinous or other plastic binder which produces a smooth continuous surface for the compacted article. It also consists in such an article wherein the fibers are disposed in layers with the fibers of each layer extending in the same general direction and intersecting fibers of other layers, especially when the mat has been needled prior to the application of the binder thereto. It also consists in the article hereinafter described and claimed.

In the accompanying drawing, which forms part of this specification and wherein like symbols refer to like parts wherever they occur, Fig. 1 is a plan view of a portion of the loose open mat which forms the major portion of my smooth surface fibrous article, Fig. 2 is an edge view of said mat, Fig. 3 is a diagrammatic view illustrating the needling operation which reduces the thickness of the mat, Fig. 4 is an edge view of a blank cut from the reduced mat with bonding material applied to the surfaces thereof, Fig. 5 is an edge view of the coated mat after it has been compressed to produce a flat sheet or plate with the bonding material mainly concentrated at or near the surface portions thereof, Fig. 6 is a face view of the finished compressed fibrous article shown in Fig. 5, Fig. 7 is an edge view of three mats used to produce a laminated sheet or plate, both surfaces of the top and bottom mats being coated with bonding material and the intermediate mat being uncoated, Fig. 8 is an edge view of a laminated sheet or plate produced by pressing together the laminations shown in Fig. 7, the bonding material being distributed throughout the thickness of the article, Fig. 9 is an edge view of two mats used to produce a laminated sheet or plate, with the bonding material applied to the remote surfaces only thereof;

Fig. 10 is an edge view of a two ply laminated sheet or plate formed by pressing together the mats shown in Fig. 9, the bonding material being shown mainly concentrated at the surface portions.

The major portion of my article consists of fiber, preferably raw sisal, which is the well known commercial commodity wherein the individual sisal fibers are still joined together in natural vascular bundles. In the manufacture of my article, the fibers 1 are formed into an unwoven mat made up of groups of fibers, hereinafter called layers, with the fibers of each layer free from tension and more or less bowed and wavy but extending in the same general direction as the other fibers of the same layer and crosswise or at an angle to fibers in other layers. After the desired number of layers have been laid or superposed, the work is a very loose open mat A1. This loose open mat is then "needled," that is, it is subjected to the action of a multiplicity of forked or barbed needles 2 that are forced transversely through the mat as it is fed between vertically spaced bed and stripper plates 3 and 4, respectively, by a lower endless feed belt 5 and an upper feed roll 6 on the entering side of said plates and by a spiked lower pull-off roll 7 on the opposite side thereof, both plates having registering holes therethrough for said needles. The effect of needling is to draw certain of the fibers into loops or bights 8 that extend through and beyond the body of the mat and reduce the thickness thereof to a considerable extent. In this condition, the mat A2 is still loose and open but much thinner than it was when first laid, and those fibers (meaning vascular bundles), that were directly acted upon by the needles and thereby pressed into loops, serve as ties for holding together the two surface portions of the mat. These surface portions are very rough and have many fiber ends and loops extending therefrom.

At this stage of the process of manufacturing my article, resin or other plastic bonding material 9 is applied thereto, in any suitable way, as by spraying or with a liquid resin glue spreader. It is then tunnel dried, oven dried or air dried. Among plastic or resinous materials that can be spread, dipped or sprayed and are otherwise suitable for producing my article are the following: thermo-setting resinoids or resinous materials in suitable dispersion, emulsion or solution, such as urea-formaldehyde and phenol formaldehyde laminating varnishes; thermo-plastic adhesive materials such as, for example, vinyl resin solutions or natural gums; and latex emulsions or recovered rubber dispersions.

After the resinous or plastic material 9 has been applied to the surface or surfaces of the mat A2, the mat is cut to proper size and shaped and subjected to pressure. If desired, the coating of bonding material may be applied after sizing and shaping. If the product is to be flat, such pressure can be applied by a hydraulic or mechanical press or by calender rolls if thermoplastic binders are used. The density of the article and its surface finish may be controlled by varying the pressure. If the product is to be other than flat, a blank of suitable pattern is cut from the coated mat and such blank is placed in a suitable mold and pressure applied thereto as in other cases of compression molding.

In the final product A3, the fibers 1 maintain the same general directional relation that they had when first laid into the mat A1 and, therefore, are well disposed to take care of stresses in all directions, including the shear stresses that are taken care of by the needled bights or loops 8.

The principal functions of the adhesive coating 9 are to bond the fibrous material and to form a suitable surface or surfaces for the article. It is uneconomical to use more of the bonding material than is required for these two purposes as resin and other suitable bonding material are very much more expensive than sisal. By applying the bonding material in the form of a coating, or a spray or a fine dust to the surfaces of the needled pad, the quantity of bonding material needed to stiffen the article and give it the desired smooth surface may be much less than would be needed to permeate the mat or fill the interstices throughout the whole thickness of the mat. For instance, by applying the bonding material in the form of a roll coating, the fibers in the surface portion of the mat are covered with a thin coat but some of the binder penetrates into the voids or interstices in the mat so that, when the mat is pressed, the surface coating flattens out into a thin continuous smooth sheet that bonds together the surface portions of the fiber, while the minor quantity of bonding material that penetrates the body of the mat is sufficient for the light bonding duty required in the body portion. In fact, the loops or bights 3 of fiber produced in the needling operation may alone be able to take care of the shearing stresses that may arise in such body portion without the aid of plastic bonding material.

By way of example, I have found very satisfactory results with a needled web of sisal weighing about .25 pound per square foot by coating both surfaces of said web with a liquid phenolformaldehyde laminating varnish containing seventy per cent solids, such as in common use in the paper laminating industry, at the rate of four ounces of the varnish to one square foot of web, the varnish containing approximately twenty percent by weight of a suitable filler. With this varnish used in this proportion, this quantity of varnish or resinoid is sufficient to stiffen the mat and form a thin continuous surface skin thereon, while the interior part of the article consists almost wholly of raw sistal.

The completed article A3, made as above described, is in the form of a flat sheet or plate with a smooth impermeable surface or surfaces, somewhat resilient but of considerable stiffness and of very great strength, practically shatterproof, and having resistance to chemical action varying with the particular resin or bonding material used. Fillers such as wood flour, wheat flour, pulverized silica, china clay, calcium carbonate, and others may be used in limited quantity as in other plastic compositions. Such fillers are useful in retarding resin migration into the main body of the pad and to improve the surface of the final product and are very cheap.

Instead of applying the bonding material in a liquid spray, or coating, such material may be applied to the surface of the needled mat in the form of dry thermo-plastic or thermosetting powder. In such case, a minor portion of the fine powder will find its way into the interior of the mat but the greater proportion thereof is concentrated at the surface and, when pressed in heated molds, softens and spreads into a continuous coherent skin that forms the surface of the article, with the minor portion serving as a bond for the interior thereof.

I have stated one particular example illustrating the proportion of bonding material to the sisal or fibrous material. In that instance, the product was a sheet of about .075 inch thick. A sheet containing double the amount of fiber could be adequately bonded with only little more of the bonding material for the reason that the greater portion of the bonding material can be concentrated at and near the surface of the article. A greater quantity of bonding material could be used but, for many purposes, it would unnecessarily increase the cost of the article without any adequate advantage to offset such extra cost.

The foregoing description deals with single ply products although said single ply is made of a plurality of layers or groups of fiber laid crosswise. Obviously, several plies or laminations can be superposed and pressed together to form a laminated product. As shown in Fig. 7, there are three superposed mats or plies A2, and both sides of the top and bottom mats are coated, while the intermediate mat is not coated on either side. These three mats are then pressed together in a hot press, whereby the heat and pressure bond the mats together to form the three ply article A4 shown in Fig. 8, with the bonding material distributed throughout the thickness of the article. As shown in Fig. 9, two superposed mats or plies A2 are coated on their remote surfaces; and these mats, when subjected to heat and pressure, are bonded together to produce the two ply article A5 shown in Fig. 10, with the bonding material mainly concentrated at or near the surface portions of said article. As previously stated, before the mat receives its coat of bonding material, it is loose and open and has fiber ends and loops projecting therefrom. These projecting ends and loops become quite stiff when the bonding material thereon hardens and when one coated and dried mat is laid on another, its stiffened fiber ends and loops pierce their way into the body interstices of the other mat even before the two mats are pressed into a laminated unit and thus serve as ties and increase the shear strength of the unit.

The article hereinbefore described is in sheet form whether of one or more plies. Such sheets are shatterproof and nails may be driven through them without any danger of splitting or fracturing.

My product is not necessarily flat. On the contrary, after a needled pad has been coated or dusted with bonding material, blanks of suitable patterns may be cut therefrom. These blanks may be inserted in pressure molds or dies that are suitably heated to a temperature sufficient to soften or polymerize the bonding material under the pressure used for molding. In this way, the product will be a thin coated article conforming to the mold in which it is pressed. The product of such pressure molding is an article with thin but strong shatterproof walls and smooth surfaces.

While raw sisal with its fibers still in their long natural bundles is very strong and cheap and exceptionally well adapted for use in my invention, other fibers may be used therein, especially fibers that are long enough to be laid crisscross in predetermined directions without weaving.

The process hereinbefore disclosed is not claimed herein but is more fully described and claimed in a copending application Serial No. 331,516 filed April 25, 1940.

What I claim is:

1. A compressed article of manufacture having a major portion that consists of an unwoven mat of fiber of a length of the order of raw commercial sisal and a minor portion that consists of resinous bonding material that is mainly concentrated at and near the surface of the mat in a thin continuous smooth sheet and decreases in amount towards the middle of the article.

2. A compressed article of manufacture having a major portion that consists of an unwoven mat of raw commercial sisal and a minor portion that consists of resinous bonding material that is mainly concentrated at and near the surface of the mat in a thin continuous smooth sheet and decreases in amount towards the middle of the article.

3. A stiff compressed article of manufacture whose body portion comprises a mat of unwoven fibers some of which have loops extending through the mat, the surface portion of the mat being bonded by resinous bonding material which constitutes a minor quantity of the entire article, a fractional portion of said material penetrating inwardly beyond said surface portion.

4. A stiff compressed article of manufacture whose body portion comprises a mat of unwoven raw commercial sisal some of whose fibers have loops extending through the mat, at least the surface portion of the mat being bonded by resinous bonding material which constitutes a minor quantity of the entire article and forms a continuous smooth surface therefor, a fractional portion of said material penetrating inwardly beyond said surface portion.

5. An article of manufacture consisting of layers of raw sisal and material for bonding same densely compressed together, the fibers of each layer extending in the same general direction and crosswise of the fibers of other layers, the bonding material being concentrated at the surface portions of the article and forming a continuous smooth surface therefor and the middle portion of the article containing only a minor portion of bonding material all the bonding material being of the same composition.

6. An article of manufacture consisting of layers of fibers long enough to enable all the fibers of a layer to extend in the same general direction and material for bonding same densely compressed together, the fibers of each layer extending in the same general direction and crosswise of the fibers of other layers, the bonding material being concentrated at the surface portions of the article and forming a continuous smooth surface therefor and the middle portion of the article containing only a minor portion of the same bonding material.

7. A laminated and compressed article of manufacture each of whose laminations has a major portion that consists of an unwoven mat of raw sisal and a minor portion that consists of resinous bonding material that is mainly concentrated at and near the surface of the mat all the bonding material being of the same composition.

8. A laminated and compressed article of manufacture each of whose laminations has a body portion consisting of a mat of unwoven fibers some of which have loops extending through the mat, and the surface portion of the mat being bonded by resinous bonding material which constitutes a minor quantity of the entire lamination and decreases in amount towards the middle of the article.

9. A laminated and compressed article of manufacture each of whose laminations has a major portion that consists of an unwoven mat of raw sisal and a minor portion that consists of resinous bonding material that is mainly concentrated at and near the surface of the mat, each lamination having a multiplicity of fibers that project therefrom into the next adjacent lamination.

10. A laminated and compressed article of manufacture each of whose laminations has a major portion that consists of an unwoven mat of raw sisal and a minor portion that consists of resinous bonding material that is mainly concentrated at and near the surface of the mat and decreases in amount towards the middle of the article, each lamination having a multiplicity of fibers with resin-stiffened portions that project into the body of the next adjacent lamination.

KARL J. KOPPLIN.